United States Patent
Kremers

[11] Patent Number: 6,014,481
[45] Date of Patent: Jan. 11, 2000

[54] DEVICE FOR COUPLING AND DECOUPLING OPTICAL SIGNALS OF TWO TRANSMISSION CHANNELS

[75] Inventor: Ernst Kremers, Murrhardt, Germany

[73] Assignee: Robert Bosch GmbH, Stuttgarrt, Germany

[21] Appl. No.: 08/986,707

[22] Filed: Dec. 8, 1997

[30] Foreign Application Priority Data

Dec. 10, 1996 [DE] Germany .......................... 196 51 236

[51] Int. Cl.$^7$ ..................................................... G02B 6/26
[52] U.S. Cl. ............................................................ 385/24
[58] Field of Search ............................ 385/24, 31; 372/6

[56] References Cited

U.S. PATENT DOCUMENTS

| | | | |
|---|---|---|---|
| 5,132,976 | 7/1992 | Chung et al. | 372/6 |
| 5,181,210 | 1/1993 | Chung et al. | 372/6 |
| 5,699,371 | 12/1997 | Handa et al. | 372/6 |

FOREIGN PATENT DOCUMENTS 0 440 276 B1  2/1996  European Pat. Off. .

*Primary Examiner*—Hung N. Ngo
*Attorney, Agent, or Firm*—Michael J. Striker

[57] ABSTRACT

The device for coupling and decoupling signals of two transmission channels has an optical amplifier and a first optical coupler connected upstream in a transmission direction from the amplifier and a second optical coupler connected downstream from the amplifier. The first coupler (K1) decouples signals of a first transmission channel fed to the amplifier. The second coupler (K2) couples signals of another transmission channel (m) (n) together with signals in a second transmission channel (o) into it from the amplifier. The device is suitable as an add/drop multiplexer and couples and decouples transmission channels using only one optical amplifier for each transmission direction.

25 Claims, 1 Drawing Sheet

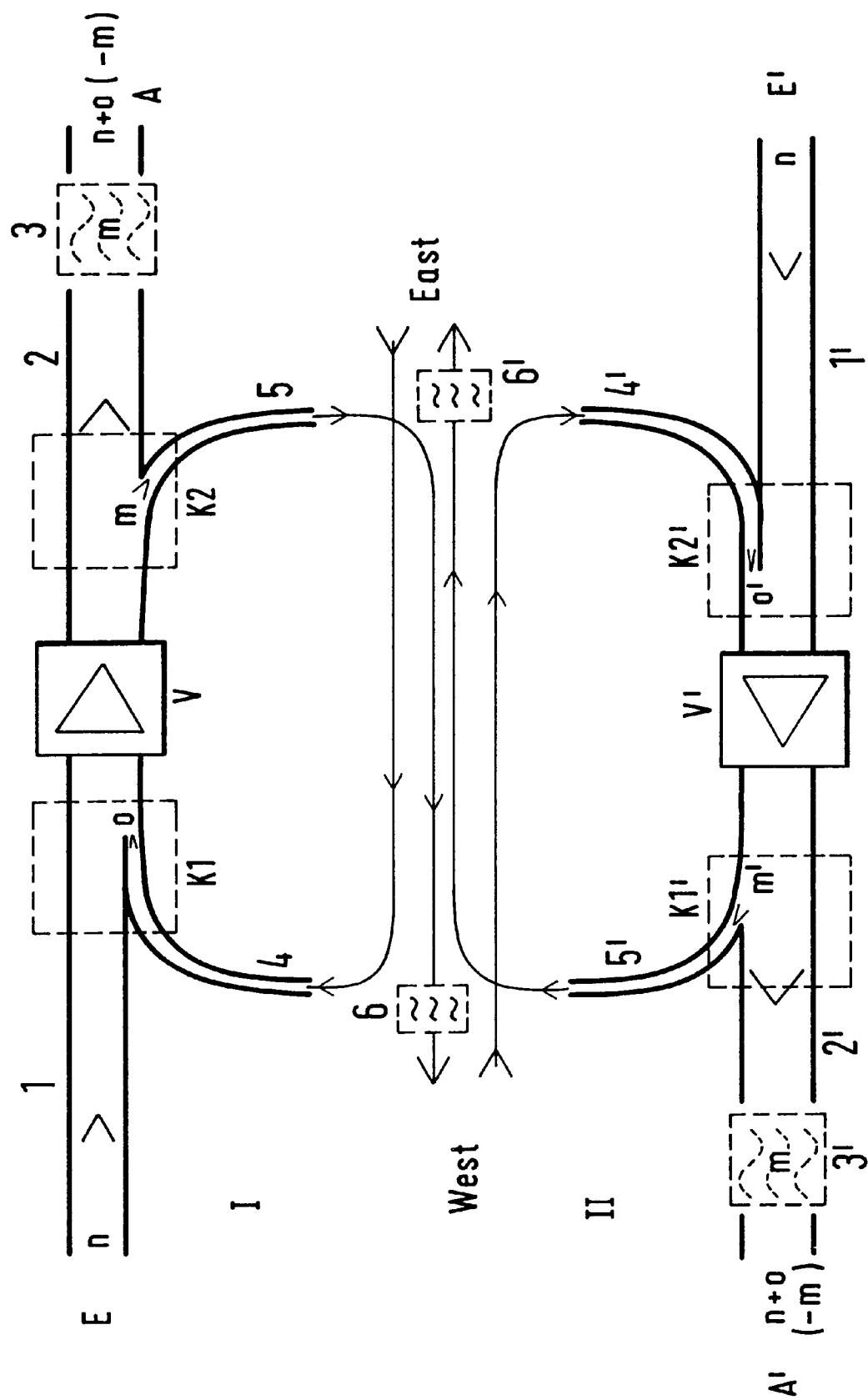

DEVICE FOR COUPLING AND DECOUPLING OPTICAL SIGNALS OF TWO TRANSMISSION CHANNELS

BACKGROUND OF THE INVENTION

The present invention relates to a device for coupling and decoupling optical signals which includes an optical amplifier and two optical couplers, one coupler of which is located upstream of the amplifier, and the other, downstream of the amplifier, in each of two respective transmission channels.

An optical light wave guide-transmission line for telecommunications signals is described in European Patent application EP 0 440 276. This optical light waveguide-transmission line has an amplifier and two couplers provided on opposite sides of the amplifier, which couple and decouple service signals which have other wavelengths than the telecommunications signals. The telecommunications signals, but not the service signals, are conducted through the amplifier.

It is common in a so-called add/drop multiplexer to provide two optical amplifiers in series close to each other with two couplers between them separated from each other by a filter. The first coupler thus acts to decouple the signals of one transmission channel and the second coupler acts to couple in signals from another transmission channel, which can have the same or a different wavelength from the first transmission channel. The filter connected between them has a blocking action for signals coupled out from the first coupler.

SUMMARY OF THE INVENTION

It is an object of the present invention to provide an improved device for coupling and decoupling optical signals in two transmission channels, each of which have an amplifier and two optical couplers.

According to the invention, the device for coupling and decoupling optical signals includes an optical amplifier and two optical couplers, one of which is connected to the amplifier upstream of the amplifier in a transmission direction and the other, to the amplifier downstream of the amplifier to receive input from the amplifier. The amplifier comprises means for amplifying signals of at least two transmission channels having different wavelength ranges. The first optical coupler is arranged upstream of the optical amplifier and includes means for coupling signals of a first of the transmission channels fed to the amplifier and the second optical coupler is arranged downstream of the amplifier and includes means for decoupling signals of another transmission channel received from the optical pamplifier.

The device according to the invention allows both amplification in several transmission channels by the same optical amplifier and also a coupling and decoupling of transmission channels using only one optical amplifier for each transmission direction in a simple manner. The signals in the coupled-in transmission channel cover a wavelength range (frequency range), which is neither covered by the decoupled transmission channel nor by the remaining transmission channel.

The required selection can occur separately from the coupling and decoupling.

The device according to the invention is especially suitable in one embodiment as an add/drop multiplier.

Several preferred embodiments of the invention are described below, the significant features of which may of course be combined with each other. At least one optical coupler can be a fiber-optic coupler or can be wavelength selective.

Advantageously the second optical coupler has an outlet branch and a wavelength selective bandpass filter connected to the outlet branch for decoupled signals traveling over it. The bandpass filter can be tunable.

A transmission line is advantageously connected downstream in a transmission direction to the second or other optical coupler and a blocking filter can be provided in the transmission line for non-decoupled signals from the second or other optical coupler. The blocking filter includes means for blocking signals of another transmission channel. The transmission channels each have means for transmitting wavelengths in an identical transmission window of a light waveguide.

BRIEF DESCRIPTION OF THE DRAWING

The objects, features and advantages of the present invention will now be described in further detail in the following description of preferred embodiments, reference being made to the accompanying drawing, in which the sole FIGURE is a schematic diagram of a preferred embodiment of a device for coupling and decoupling optical signals in two transmission channels according to the invention.

DESCRIPTION OF A PREFERRED EMBODIMENT

A first part I of the device according to the invention including an optical transmission line for telecommunications signals is shown in the figure and has an entrance E and an outlet A. A light waveguide 1 is connected to a following optical coupler K1, preferably a fiber-melt coupler. An optical amplifier V is connected to this first optical coupler K1 downstream in a transmission direction from the coupler K1. The amplifier V is then connected to another or second following optical coupler K2 whose output is fed to another light waveguide 2. This other light waveguide 2 is connected by an optional blocking filter 3 with the outlet A of the first part I of the device.

The first optical coupler K1 has an input branch 4, to which optical signals from an east direction (opposite to the transmission direction in the optical transmission line) are fed. The other optical coupler K2 has an outlet branch 5, from which optical signals travel in a west direction. In this latter direction an optional bandpass filter 6 is provided, which can be tunable (especially when the other optical coupler K2 is not frequency selective in regard to the signals coming in over the outlet branch 5).

Until this point the description of this embodiment of the invention relates to the first part I of the device according to the invention, which is provided with at least one channel n from the entrance E to the outlet A for a predetermined signal transmission direction.

A generally equal second part II of the device according to the invention, shown under the part I in the sole figure, acts as means for transmission in an opposite direction from the transmission direction of part II. Elements of part II, which are the same or similar to elements of part I, are indicated with the same reference number as in part I, except that an apostrophe has been added. Also a bandpass filter 6' can be provided in part II of the device which permits transmission in the east direction.

The operation of the preferred embodiment is described hereinbelow. However only the operation of the first part I of the device is described here, because it is the same as that of the second part II.

Signals of at least one transmission channel n are input to the first optical coupler K1 in the indicated direction. Signals of the transmission channel o from the east direction are available to the first coupler via the branch input 4. The signals of the transmission channels n and o are amplified by the optical amplifier V. Signals in a transmission channel m, which were supplied from the entrance E in one of the transmission channels n,o are taken off over the outlet branch 5 by the second or other coupler K2 following the amplifier. The signals from the outlet branch 5 are guided in a direction west (through the optional bandpass filter 6 having the bandwidth of the transmission channel m). The signals of the remaining channels leave the coupler K2 via the light waveguide 2.

The transmission channels n (without m) and o, or however n (with m) and o, are carried in the light waveguide 2 according to the wavelength selectivity of the coupler 2. In the latter case the blocking filter 3 is used to filter out the signals of the transmission channel n (without m) and o.

Of course the number of transmission channels passed through the optical amplifier V in the device according to the invention is larger than the number of the transmission channels at the entrance and/or outlet of the device, which however leads to a limitation in the number of transmittable transmission channels when the amplifier bandwidth limits the number of channels. It is important that the number of required optical amplifiers and thus the costs are reduced for the device according to the invention.

Alternative embodiments are possible. Thus when the coupler K2 itself is not sufficiently wavelength selective so that signals of the transmission channel m are present in the light waveguide 2, it is important that the blocking filter 3 be immediately activated when the signals of the transmission channel m should be divided in several directions, namely in the west direction and in a direction below the outlet A.

When the bandpass filter 6 is tunable, a channel selection can thereby occur, in so far as it is provided by the coupler K2, so that signals of several transmission lines flow over the outlet branch 5.

This example illustrates that the reference number n, o and m do not necessarily represent only one transmission channel, but also can represent several transmission channels.

The present invention is also disclosed in German Patent Application 196 51 236.0 of Dec. 10, 1996 which forms the basis for a claim for priority for the present invention under 35 U.S.C. 119. The subject matter of the invention found in this German Patent Application is hereby incorporated by reference.

I claim:

1. A device for coupling and decoupling optical signals, said device comprising an optical amplifier and two optical couplers, one of said couplers being connected to said amplifier upstream of said amplifier in a transmission direction and another of said couplers being connected to said amplifier downstream of said amplifier to receive input from said amplifier, wherein said optical amplifier comprises means for amplifying signals of at least two transmission channels having different wavelength ranges, wherein the one of said optical couplers arranged upstream of said optical amplifier in said transmission direction consists of means for coupling signals of a first one of said at least two transmission channels together with signals of a second one of said at least two transmission channels into said optical amplifier and wherein said another of said two optical couplers arranged downstream of said optical amplifier has an outlet branch and consists of means for decoupling signals of another transmission channel from said optical amplifier, said signals in said another transmission channel from said optical amplifier having been supplied in one of said at least two transmission channels to said optical amplifier.

2. The device as defined in claim 1, further comprising an add/drop multiplexer.

3. The device as defined in claim 1, wherein at least one of said optical couplers (K1,K2) is a fiber-optic coupler.

4. The device as defined in claim 1, wherein at least one of said optical couplers is wavelength selective.

5. The device as defined in claim 1, further comprising a wavelength selective bandpass filter connected to the outlet branch for decoupled signals.

6. The device as defined in claim 5, wherein said bandpass filter (6) includes means for tuning.

7. The device as defined in claim 1, further comprising a transmission line connected downstream in a transmission direction to said another optical coupler (K2) and a blocking filter (3) provided in the transmission line for non-decoupled signals from said another optical coupler, and wherein said blocking filter (3) includes means for blocking said signals of said another transmission channel (m).

8. The device as defined in claim 1, wherein said transmission channels each have means for transmitting wavelengths in an identical transmission window of a light waveguide.

9. The device as defined in claim 1, further comprising a communication network and said optical couplers are arranged immediately next to said amplifier.

10. The device as defined in claim 1, wherein said amplifier is included in a unit together with said optical couplers.

11. The device as defined in claim 1, further comprising another of said device for transmission in an opposite transmission direction from said transmission direction and arranged in a common unit.

12. The device as defined in claim 1, wherein said amplifier includes means for amplifying more than two (o,n) of said at least two transmission channels of different wavelength ranges.

13. A device for coupling and decoupling optical signals, said device having an entrance and an outlet, an optical amplifier arranged between the entrance and the outlet, a first optical couplers arranged between the entrance and the optical amplifier and a second optical coupler arranged between the optical amplifier and the outlet;

wherein said optical amplifier comprises means for amplifying signals of at least two transmission channels having different wavelength ranges, wherein the first optical coupler consists of means for coupling signals of a first one of said at least two transmission channels together with signals of a second one of said at least two transmission channels into said amplifier, and wherein said second optical coupler has an outlet branch and consists of means for decoupling signals of another transmission channel from said amplifier and a total number of said at least two transmission channels fed to said amplifier is greater than a total number of said transmission channels at said entrance and/or said outlet, said signals in said another transmission channel from said optical amplifier having been supplied at said entrance in one of said at least two transmission channels to said optical amplifier.

14. The device as defined in claim 13, further comprising an add/drop multiplexer.

15. The device as defined in claim 13, wherein at least one of said optical couplers (K1,K2) is a fiber-optic coupler.

16. The device as defined in claim 13, wherein at least one of said optical couplers is wavelength selective.

17. The device as defined in claim 13, further comprising a wavelength selective bandpass filter connected to the outlet branch for decoupled signals.

18. The device as defined in claim 17, wherein said bandpass filter (6) includes means for tuning.

19. The device as defined in claim 13, further comprising a transmission line connected downstream in a transmission direction to said second optical coupler (K2) and a blocking filter (3) provided in the transmission line for non-decoupled signals from said second optical coupler, and wherein said blocking filter (3) includes means for blocking said signals of said another transmission channel (m).

20. The device as defined in claim 13, wherein said transmission channels each have means for transmitting wavelengths in an identical transmission window of a light waveguide.

21. The device as defined in claim 13, further comprising a communication network and said optical couplers are arranged immediately adjacent to said optical amplifier.

22. The device as defined in claim 13, wherein said optical amplifier is included in a unit together with said optical couplers.

23. The device as defined in claim 13, further comprising another of said device for transmission in an opposite transmission direction from said transmission direction and arranged in a common unit.

24. The device as defined in claim 13, wherein said amplifier includes means for amplifying more than two (o,n) of said at least two transmission channels of different wavelength ranges.

25. A device for coupling and decoupling optical signals in two opposite transmission directions, said device comprising means for coupling and decoupling a first plurality of said optical signals in a first transmission direction and means for coupling and decoupling a second plurality of said optical signals in a second transmission direction opposite to the first transmission direction;

wherein said means for coupling and decoupling said first plurality of said optical signals in a first transmission direction comprises a first optical amplifier having an input side and an output side, means for coupling signals in a first one of at least two transmission channels together with other signals in a second one of said at least two transmission channels together and feeding said signals coupled by said means for coupling into said amplifier at said input side of said amplifier and means for decoupling signals in another transmission channel from said output side of said optical amplifier and for taking off said signals decoupled by said means for decoupling over an outlet branch; and wherein said means for coupling and decoupling said second plurality of said optical signals in said second transmission direction comprises a second optical amplifier having an input side and an output side, means for coupling signals in a first one of at least two transmission channels together with other signals in a second one of said at least two transmission channels together and feeding said signals coupled by said means for coupling into said amplifier at said input side of said amplifier and means for decoupling signals in another transmission channel from said output side of said optical amplifier and for taking off said signals decoupled by said means for decoupling over an outlet branch.

* * * * *